(12) United States Patent
Carson et al.

(10) Patent No.: US 8,177,981 B2
(45) Date of Patent: May 15, 2012

(54) ION EXCHANGE REGENERATION METHOD

(75) Inventors: William W. Carson, Hopkinton, MA (US); Charles Dale, Morgan Hill, CA (US); William D. McClain, Phoenix, AZ (US); Robert J. Ritz, Phoenix, AZ (US); Charles Swenson, Billerica, MA (US)

(73) Assignee: General Electric Company, Schenectady, NY (US)

( * ) Notice: Subject to any disclaimer, the term of this patent is extended or adjusted under 35 U.S.C. 154(b) by 1818 days.

(21) Appl. No.: 10/510,865

(22) PCT Filed: Apr. 14, 2003

(86) PCT No.: PCT/US03/11583
§ 371 (c)(1),
(2), (4) Date: Jul. 6, 2005

(87) PCT Pub. No.: WO03/086629
PCT Pub. Date: Oct. 23, 2003

(65) Prior Publication Data
US 2006/0021944 A1    Feb. 2, 2006

(51) Int. Cl.
*B01J 49/00*     (2006.01)
(52) U.S. Cl. .......................... 210/662; 210/673
(58) Field of Classification Search ............. 210/662, 210/673, 683, 685, 739, 746, 900
See application file for complete search history.

(56) References Cited

U.S. PATENT DOCUMENTS

| | | | |
|---|---|---|---|
| 2,617,766 A * | 11/1952 | Emmit et al. | 210/662 |
| 3,246,759 A | 4/1966 | Matalon | |
| 4,264,439 A | 4/1981 | Lefevre et al. | |
| 4,320,010 A * | 3/1982 | Tucci et al. | 210/662 |
| 4,427,549 A | 1/1984 | Brown et al. | |
| 4,563,272 A * | 1/1986 | Yoshida et al. | 210/93 |
| 5,811,012 A | 9/1998 | Tanabe et al. | |
| 5,833,846 A | 11/1998 | Tanabe et al. | |
| 6,884,356 B2 * | 4/2005 | Kosenka et al. | 210/662 |

* cited by examiner

*Primary Examiner* — Matthew Savage
(74) *Attorney, Agent, or Firm* — GE Global Patent Operation; Peter T. DiMauro

(57) ABSTRACT

An improved process for regenerating ion exchange resin, includes a regeneration step of displacing captured ions from the resin to regenerate its ion-capture functionality, followed by one or more fluid-employing post-regeneration steps such as a fluid displacement or rinse, a fluid transport or mixing, and a rinse down to quality. To avoid problems of early leakage of weakly held ions such as boron, the post-chemical or postdisplacement steps use water that is essentially free of boron, or otherwise avoid localized contamination in the regenerated resin which is used in bottles or beds (30). A two-stage polish may be operated with modified lead/lag bottles. A detector (D) for an indicator condition (conductivity, silica breakthrough) between stages determines when to shift the lag bottle forward, and periodically both bottles are replaced.

9 Claims, 7 Drawing Sheets

ION EXCHANGE REGENERATION METHOD

This invention relates to water purification and to ion exchange media.

It also relates to methods for regenerating exchange media for use in providing ultrapure water for semiconductor fabrication or other processes requiring product water substantially free of impurities.

It also relates to production of ultra pure water (UPW), and to sensing, control and maintenance in a water processing system that relies upon a measurement, such as a measurement of conductivity or the concentration of species in the feed or product stream, as an indicator or control parameter.

BACKGROUND

Many processes, such as semiconductor fabrication processes, require water to have an extremely low concentration of ionic and non-ionic impurities. A manufacturing or processing facility with such requirements generally establishes a dedicated water purification plant having suitable treatment capacity and impurity removal characteristics to meet its process requirements. Such a treatment plant typically includes a number of different treatment stages specially selected and arranged to be effective with the particular feed stream received from a local supply, such as a municipal water system, a surface water, a ground water well, treated wastewater or a combination of such sources. When the feed supply is received by the end-user, e.g., by a semiconductor wafer plant, the in-plant treatment of the resulting feed stream achieves a higher degree of purity by processes such as water filtration, conditioning such as softening or pH adjustment, and deionization, demineralization, degasification or other impurity removal treatments. One common initial treatment is to pass the feed through reverse osmosis (RO) membranes, or through ion exchange beds. High levels of deionization are typically achieved by passing the water through units such as electrodialysis (ED) or electrodeionization (EDI) devices, and distillation may be used in some applications. Organic compounds may pass unaffected through some treatments, or may be introduced or reintroduced by organisms that colonize conduits and tanks in the system. Often these are addressed at one or more stages of treatment steps such as microfiltration, capture in activated carbon or other media, and by breakdown with ultraviolet energy or oxidation. The breakdown or oxidation products may be removed by one or more of the other processes described above.

An in-plant high purity water system may present design problems of various types. The plant must initially be designed to address the range of anticipated feed waters and dependably achieve the minimal required level of water quality. Beyond the factors of capital cost and operating expenses, and the environmental considerations raised by the volume of waste water and by-product of the contaminant-removal treatment processes, various unanticipated problems may arise. Types or levels of contaminants in the feed water may change abruptly, necessitating changes in treatment protocols. The periodically-performed process of regenerating an ion exchange bed, or the unanticipated fouling in the treatment line of a bed or membrane-based treatment system (an RO, ED or EDI unit), may destabilize or impair the treatment process or the quality of the output stream. One therefore seeks to detect problems of this type by the use of diverse monitoring instruments, such as a conductance meters or total organic carbon (TOC) monitors on the output stream or instrumentation elsewhere in the system, and suitable measurements such as off-line ICP-MS measurements. These are applied to develop or maintain robust or effective operating and maintenance procedures. Even so, the continual introduction of new fabrication technologies requires plant operators to frequently ascertain whether existing water quality specs remain sufficient.

Because the normal output water of a high purity treatment plant has such low levels of contaminants, the appearance of an unusual trace contaminant may go undetected when the overall level of the class of contaminants, such as TOC, or other parameter, such as conductance, appears to remain within generally accepted levels. Indeed, an unrecognized or unexpected contaminant might impair the response of the detector, rather than simply passing undetected. In such a case, observation of variation in a process parameter (such as the stability or sensitivity of lithographic exposure or development) or a decrease in quality of a manufactured product (observed, e.g., as an increase in number of defects in a semiconductor wafer) may provide the first indication that the product water has experienced a detrimental change. In this case, investigation is needed to identify the responsible contaminant or treatment unit, and to develop procedures that will, in the future, prevent such quality deviations or detect the responsible agent before it affects the production line. Production down time is quite costly, and the observation of unexplained defects or process variations raises the possibility of additional undetected latent defects, and the specter of defective manufactured products further down the manufacturing train.

Focusing on just one impurity relevant to the present invention, it is generally thought that the presence of boron in UPW product water of a semiconductor fab plant will impair a number of semiconductor processes unless its presence is specifically addressed (for example by effective reduction of the boron load, if necessary, in a first stage, and by use of boron-scavenging resin, ion exchange bottles or other special boron removal unit in a polish loop.) Some fab plants have therefore adopted a conservative approach, removing boron to a very low level, for example by a boron-selective resin column or bed, as shown, for example, in U.S. Pat. No. 5,833,846.

Other ions must also be controlled to below trace concentrations. For this purpose it is common to have a number of exchange resin bottles or tanks in a polish stage of the primary make up water treatment line. Because the ionic concentrations in the final stage are already quite low, the resin can last for an extended period before exhaustion. A conductivity monitor can be positioned after the polisher to provide a prompt indication when the resin approaches exhaustion. When the resin becomes exhausted, ions start to break through, and this condition may be detected by the onset of an increase in conductivity of the product water. A silica detector may also be used to detect the onset of resin breakthrough.

At this stage, it is common practice to send out the polish stage ion exchange bottles for regeneration of their resin.

Fab plants typically also have a final polish loop for the UPW water produced by the primary make-up treatment line that has been stored in a tank, to effect final polishing just before the water is pumped out to the various plant processes. Since this final polish loop deals with water that is already substantially deionized, the exchange resin beds or bottles see only small amounts of contaminants and may last for an extended time, e.g., several years, before breakthrough or exhaustion of the resin occurs. These bottles are often replaced with virgin resin, rather than regenerating the resin. Since the simple act of attaching a fresh bottle into the loop, or performing any conduit connections, risks introducing some contaminants into the final loop, it is desirable to carry out such replacements carefully, and as infrequently as possible.

For the polish stages of the primary make up treatment line, the resins are usually regenerated. However, problems may be encountered at this stage. Resin regeneration facilities deal with large quantities of mixed resins from diverse sources. Spent resin from mixed bottles or beds must be separated into anion and cation exchange resins before regeneration, and the separation processes, typically relying on fluidized settling separation properties affected by density, bead size and the like are necessarily imperfect. There is thus a possibility of introducing unanticipated contamination from other resins during various regen resin handling plant operations, e.g., conglomeration, separation by type, regeneration, rinsing, re-mixing and bottle filling. Regeneration of fab plant resins should therefore be performed by a facility that can observe special precautions in the handling of such resins, and the regen process should be tightly controlled or specified. Often, plants will have only one qualified vendor. Larger fab plants may perform their own regeneration, while some fab plants may simply require that exhausted beds be replaced with entirely new, rather than regenerated, resin.

Boron is a weakly bound ion. In operation, ions captured by ion exchange from product water in an exchange bed bind to the exchange resin, and weak ions may be displaced by other ions having a stronger affinity for the resin. The more weakly held ions are therefore continuously displaced and shifted toward the downstream end of the ion exchange bed as the upstream end becomes more saturated. The more weakly dissociated species are also captured with lower efficiency, and may extend diffusely along a relatively long depth of the ion exchange bed. Boron, in particular, has a non-self-sharpening wave front and moves through the bed well ahead of other ions. Silica, a common and weakly held ion, has recently been regarded as a good breakthrough indicator of bed exhaustion, and it may be easily detected, for example by a calorimetric, wet chemistry silica detector. The above-noted conductivity rise has also generally been considered an effective indicator of impending breakthrough, and can be detected by a common resistance meter placed downstream of the polisher.

It should also be noted that some fab plants have specified a zero detectable boron standard for their process water. This has lead to the presence of boron being addressed by various approaches, such as the replacement of the polish bed whenever boron concentration reached the detection threshold. One group has reported, however, that the latter method resulted in the need for extremely frequent regeneration of the polish bed—over one hundred times per year. They proposed instead an approach of using of a boron-selective capture resin at various places in the treatment stream ahead of the polish bed to reduce the boron load on that unit.

Recently, it has been noted that a boron breakthrough may be detected earlier than the silicon breakthrough, and before a detectable conductivity rise. For this purpose, boron concentration is monitored directly, using a sufficiently sensitive boron detection instrument. The appearance of boron in treated fab product water may then be used as an indicator of impending exhaustion of the polishing bed exchange resin. Boron is displaced earlier, preceding the breakthrough of silica, and as such constitutes an indicator that may allow a more accurate determination of, or at least an earlier, hence more secure anticipation of, the exhaustion of a normally-functioning ion exchange bed. For such specialized boron detection, one instrument maker (Sievers Instruments, Inc. of Boulder, Colo.) has developed a very sensitive boron detection instrument for UPW monitoring and treatment process control. That boron monitor, which is described in published International Patent Application WO 02/12129, now permits the detection of boron concentration at very low levels, e.g., at parts-per-trillion (ppt) concentration levels. That international patent application is hereby incorporated herein by reference in its entirety.

Boron concentration measurements made with such a detector may in principle be used to anticipate bed exhaustion and to determine timely maintenance, such as replacement or regeneration, of ion exchange beds, thus avoiding unanticipated deterioration of product water quality or costly shutdown of the water production. The detection should permit one to schedule bed replacement or regeneration well before the occurrence of leakage of silica, or of other more tightly bound and more destructive ions, through the polish unit in the product water.

However, boron is a loosely bound ion. If one is controlling based upon a very low detection threshold, it is important that the level or shape of the boron concentration curve be discerned, distinct from background. As noted above, it is also generally accepted that the absolute level of boron should be relatively low. However, early measurements with a sensitive detector have uncovered great variations in the boron-passing or release characteristics in a UPW product water polish stage. Boron is loosely held, is easily displaced, and is captured with fairly low efficiency by the remaining downstream resin. An aged resin bottle, which has already accumulated a load of boron ions, will release boron ions in proportion to the total ionic load as it nears exhaustion increase the residual level of boron when the water temperature rises a few degrees. More significantly, applicants have observed that sometimes newly-regenerated resins appear to release a large amount of boron. It appears therefore that at least some regeneration processes do not produce regenerated resin capable of sustained and dependable boron removal.

It would therefore be desirable to provide a regenerated resin having lower passing or release characteristics, and/or more effective and long-lasting capture characteristics.

It would also be desirable to provide an improved resin regeneration process that dependably produces regenerated resin having lower boron passing or release characteristics, or more effective and long-lasting boron capture characteristics.

It would also be desirable to provide an improved process for producing low-boron UPW product water.

SUMMARY OF THE INVENTION

One or more of the above desirable ends are achieved in accordance with one aspect of the present invention, by a process for regenerating a spent or at least partially exhausted ion exchange resin that dependably produces a regenerated and substantially boron-free resin. The regenerated resin, when returned to a polish unit, provides an essentially boron-free product water for a substantial time until the resin becomes highly loaded and approaches exhaustion. The resin is processed with at least one regeneration step, such as a caustic treatment for the anion resin, to displace ionic species from the exhausted anion resin and convert ion exchange sites to hydroxyl form. The resin processing further involves one or more fluid-contact post-regen steps, such as rinsedown, fluidized transport or wet mixing steps. In accordance with a principal aspect of the invention, the fluid-contact post-regen steps are performed with boron-free water, and/or are performed in a manner that avoids exchange of hydroxide ions from regenerated anion exchange resin with ions from any ambient fluid, and which preferable avoids exchange of hygdrogen (hydronium) ions from any regenerated cation exchange resins with cations from ambient fluid. In as much as hydrogen form cation resin can sorb weak acids, such as boric, silicic, carbonic and carboxylic acids in equilibrium with ambient fluid, and hydroxide form anion exchange resin can similarly sorb weak bases such as ammonia, urea and amines, it is preferable that fluids coming into final contact with such regenerated resins be substantially free of such weak acids and weak bases, respectively, and preferably completely free as measured by any relevant analytical technique. Post-regen steps should also avoid incorporating orphan resin particles in the separated resins—that is, anion exchange particles in the resin intended to be exclusively cation exchange particles and cation exchange particles in the resin intended to be exclusively anion exchange particles. Such steps should also be carried out to avoid incorporating non-regenerated resin particles of any type.

In accordance with another aspect of the invention, a water treatment plant is operated to produce pure water for use in regeneration and particularly for any post-regen steps—rinsing, final rinsing, resin mixing, resin transport and any other unit operations requiring fluid contact in the overall regeneration procedure. The treatment plant includes and provides a boron-free water output. As noted above, such output is preferably free of all weakly ionizable acids and bases, as well as their ionization products; that is, such output is intrinsic water. For example, the product water stream may pass through various purification unit operations followed by one or more polish unit operations intended to produce a stream of water that is essentially or substantially intrinsic. The product stream may, for example, be sent to one or more tanks or reservoirs for later use in regeneration and post-regeneration steps. The product water may be segregated among such tanks according to the quality of water actually obtained, and the best quality water used for more critical operations. The materials of construction of the tanks and conduits are selected to avoid contamination of the substantially intrinsic product water (for example a high quality PVDF) and the stored water is protected from ambient air contaminants such as carbon dioxide or microorganisms. Alternatively, or additionally, treated product water from such a tank may pass through a final polish loop with one or more polishing unit operations, such as UV treatment and electrodeionization, and may circulate to points of use in a regen plant, and/or to a regen room in a fab or other plant, with excess water being returned to the tank(s). The intrinsic water stream is monitored for boron concentration (e.g., boric acid) at one or more points, preferably at least at a position after the polisher or the final polisher, using a sensitive (preferably sub ppb) detector. Preferably the stream is also monitored, as applicable, for conductivity and other (non-boron) undesirable species, e.g., TOC, silica, inorganic carbon, urea, ammonia, amines or the like. The intrinsic water circulation or delivery to the intrinsic water tank may be suspended or diverted when a detection threshold concentration is exceeded, so that the water for regeneration processing remains free of boron and a supply of intrinsic water is thus assured for use in regeneration and post-regen rinse and other fluid processes. When this water is used in critical regen and post-regen unit operations, the resins are regenerated without picking up fresh boron or other undesirable contaminants which could elute quickly or unpredictably in service. Separate or mixed beds containing resins regenerated and post-treated in accordance with this invention using intrinsic water, however, produce water having a stable and low content of boron and/or such other contaminants.

It is preferred that the separate or mixed beds employ solely resin that has been treated in accordance with the invention. However in other embodiments, only resin in a downstream portion of the bed or beds may be so treated. In that case, any leakage from or through upstream portions is sorbed by the downstream portion(s). It has been found, however, that if an upstream portion of the bed is or has been contaminated by boron or other weakly held species, such species will march down the bed, even if the feed to the bed is intrinsic water. This phenomenon may be attributed to constant re-equilibration of weakly held species with flowing ambient water.

A water treatment system of the invention may employ a bed of boron-scavenging resin, such as boron chelating anion exchange resins based on glucamine or the like, and/or aggressively regenerated strong base anion exchange resin to substantially remove boron. Preferably one or more detectors monitor boron at relevant locations in the treatment system, e.g., samples water downstream or upstream of the resin bed, or a probe samples within the resin bed, for example toward a downstream end thereof or at the output of the upstream stage of a two-stage polisher. By sampling at least one point ahead of the final outlet, the detector is able to determine a profile of the remaining resin activity, and deduce the condition of the bed or the output quality of water treated by the bed, earlier or more accurately. By sampling upstream of the bed, one may determine a time/flow profile of remaining treatment capacity, may implement a predictive model of the boron uptake for scheduling resin replacement or regeneration, and may predict the output water quality and its suitability for different end uses.

One embodiment of a UPW treatment system, or a treatment system used to provide intrinsic water for regeneration and/or post treatment of resin, may employ an ion exchange unit comprising an upstream resin bottle or contactor unit and a downstream resin bottle or contactor unit, with one or more detectors, such as a silica detector, a urea detector, a conductivity detector or a boron detector, positioned between the units. Based on detection of a threshold, or an actual or anticipated breakthrough, the upstream unit is removed for regeneration, while the downstream unit is moved to the upstream position and a new or regenerated bottle is placed in the downstream position. With this lead/lag arrangement, the downstream position is largely shielded from the major ionic load, and experiences only a low level of displaced weakly bound ions; it thereby provides a substantially full ion exchange capacity when moved to the upstream position, with only a slight initial ionic loading that is, moreover, largely comprised of weakly ionic species such as boron and silica, concentrated at its upstream end. Thus, in upstream service it will capture all strongly bound ions, and recapture substantially all weakly bound ions displaced by the strongly bound ions, passing only a slightly higher residual level of weak ions. When the detector again detects impending exhaustion of the upstream bed, the upstream bottles are again sent out, and the downstream unit(s) moved forward and replaced by new units. At regular intervals, for example at every third silica or conductivity breakthrough of the upstream bottle, both bottles may be sent out for regeneration. This modified lead/lag procedure assures that, at no point does the current downstream bottle possess a distribution of weak ions that would bleed at an unacceptable level into product water. While such bed rotation has been described in terms of two resin contactor units, more units may be used, for example in a "carousel" arrangement.

It will be seen that in principal according to this invention, in an ion exchange resin regeneration facility making regenerated resin intended to produce essentially intrinsic water, part of the resin so regenerated may be diverted to furnish the intrinsic water for the resin regeneration processes. In order to minimize the amount of resin needed for this water supply, it is preferable that the water be extensively pretreated by unit operations of known type so that it is substantially free of TOC and minerals. Also, while the invention is described largely with specific reference to removal of boron to below a threshold that has become critical for semiconductor fabrication, the invention applies, with corresponding changes, to any and all contaminants that are weakly bound by such resins, including silica, carbonic acid, urea, ammonia, amines, carboxylic acids and so-called "pseudo-salts" such as mercuric chloride or mercuric cyanide. These may for example belong to a class of at least slightly soluble uncharged weakly dissociated (or strongly coordinated) coordination compounds, which share some treatment properties with weakly dissociated acids and bases. Since many water sources are contaminated by industrial and agricultural effluents, and fab plant processes may be susceptible to ppt-levels of contaminant these weakly ionized or uncharged coordination compounds must be watched carefully.

BRIEF DESCRIPTION OF DRAWINGS

These and other features of the invention will be understood from the description and claims herein, taken together with the drawings of representative embodiments and illustrative details thereof, wherein:

DETAILED DESCRIPTION

Figure 1:
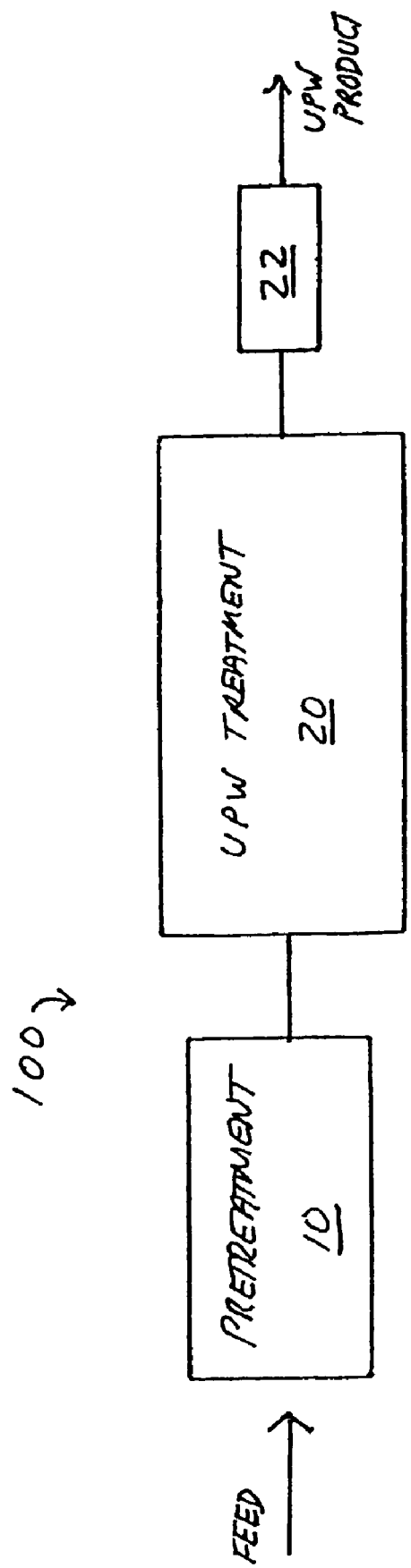
FIG. 1 is a schematic representation of a UPW treatment plant of the prior art and of the present invention.

FIG. 1 schematically illustrates a water treatment plant 100, which may be conveniently viewed as a sequence of treatment or conditioning processes (not separately identified in the FIGURE) some in series and some in parallel that perform a pretreatment 10 followed by further treatment 20 to produce a product water substantially free of impurities, i.e., intrinsic water. The exact unit operations in treatment processes 10 and 20 may vary widely, depending upon the quality of the starting water or feed stream, and the desired quantity (recovery) and qualities of the high purity treated water, i.e., the product stream.

The pretreatment 10 may include processes that are carried out upstream in the supply, such as settling, flocculation and filtration to render the water suitable for later treatment stages, as well as processes such as sterilization, softening, pH adjustment or the like which may serve to address specific impurities or to enhance the stability, yield or operation of the pretreatment or of the later stages. Typically such treatment (e.g., municipal treatment) removes a major portion of suspended solids and microorganisms, and may reduce or change the ionic load when unit operations such as coagulation and microfiltration are applied upstream. At a fab plant or regen facility, the pretreatment stage may include any of the above processes if the source is local, and may further include (generally finer) filtration, as well as operations to address species, specific contaminants or pH conditions including any introduced earlier by the upstream treatments or processes.

The treatment stage 20 may also involve a number of different processes. For example in a semiconductor primary make-up water plant, the in-plant treatment of the resulting feed stream achieves a higher degree of purity by various processes of finer filtration (e.g., by dead end cartridge filters, dead-end or cross-flow microfiltration or ultrafiltration, or precoat filters), deionization/demineralization (e.g., by ED, EDI, RO or nanofiltration, ion exchange beds or distillation), sterilization and degasification of the water. Scale-forming and other electrolytes, large molecules and a substantial portion of the ionic load may be removed by reverse osmosis (RO) membranes, while high levels of deionization or demineralization are typically achieved by passing the water through units such as electrodialysis or electrodeionization units and/or ion exchange beds. Residual levels of organic carbon compounds are often addressed by one or more steps such as capture in activated carbon or other beds, and breakdown with ultraviolet radiation or ozone, possibly preceding or following one or more of the above-listed impurity removal units that are effective for removing smaller molecules and ions produced by these processes. In some parts of the world, it is common to have a number of ion exchange resin beds constitute the major front-end treatment—e.g., a cation exchange bed, an anion exchange bed, and a mixed ion exchange bed for demineralizing the feed. In systems for producing suitably pure water various known combinations of oxidizers (e.g., catalytic and photolytic) and sorbers or filters may also be used to address organics and certain protected or poorly ionized or less soluble components.

In accordance with one aspect of the present invention, the high purity treatment stage includes a polish stage 22 in which residual impurities are removed. Polish stage 22 may be physically located at an output end of a sequence of treatment units so that it treats the water from upstream treatment operations. It may alternatively or additionally be located at the downstream end of a second or intermediate treatment segment of a multi-stage treatment plant. Typically, final polish unit operations (not shown) are also provided, e.g., downstream of polish 22 or in a portion of the plant that receives or uses water that previously passed through the polish 22, to polish water entering the plant's main UPW distribution network.

As noted above, such a final polish typically involves large capacity beds or a number of bottles, and is generally replaced with new resin when it becomes exhausted. However, the resins of polish stage 22 are typically replaced more frequently, and for this purpose, fresh regenerated resin is substituted when water quality drops or is expected to suffer. Stage 22 includes one or more exchange units, typically in the form of mixed ion exchange resin beds or bottles, of which one bottle 30 is schematically illustrated in cross section in FIG. 2. Mixed resin from such beds or bottles is preferably regenerated at a separate regeneration facility, which may be part of the same plant (for a large semiconductor fabricator) or may be an off-site independent resin reprocessing facility, rather than regenerated in situ.

Figure 2:
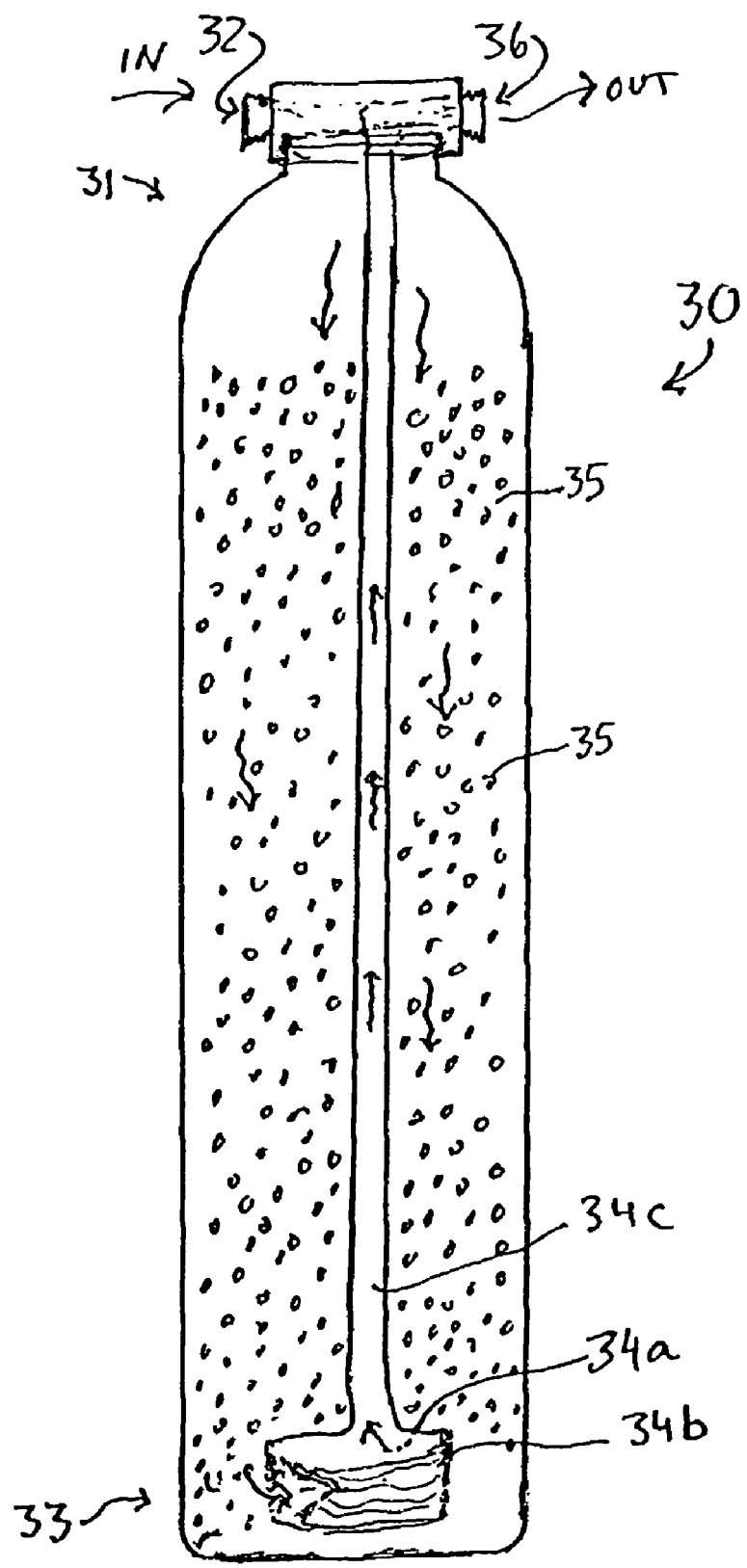
FIGS. 2 and 2A illustrate an ion exchange resin bottle and evolving ion distributions in the resin.

As shown in FIG. 2, resin bottle 30 has a water inlet 32 at its proximal end 31 through which inlet water to be treated enters and permeates downwardly through an impurity capture medium 35, e.g., a mixed bed of ion exchange resin beads, which capture the remaining impurities as the water flows toward the distal end 33 of the bottle. Various screens, filters or seals (not shown) assure that the capture medium, e.g., the beads of exchange resin, remain in the bottle. At end 33, an opening 34a in a weir-like collector plate 34b (shown partially cut away) acts as an exit port, blocking loss of beads while permitting the polished water at the distal vessel end 33 to enter the exit pipe 34c, whence it flows back up within the column of resin 35, connecting to an outlet 36 at the proximal end 31 of the bottle. Thus, in the configuration shown, water flows unidirectionally through the resin bed, from the top of bottle 30 downward, becoming progressively purified by contact with the medium, resin 35. Correspondingly, the column of resin 35 in the bottle becomes progressively mineralized, or spent, over the course of its useful life, from the top down as it captures impurities from the inlet water. Bottle 30 may be oriented in any direction, and the terms "top" or "top down" are intended only to refer to the inlet end, or the inlet-to-outlet direction.

Figure 2A:
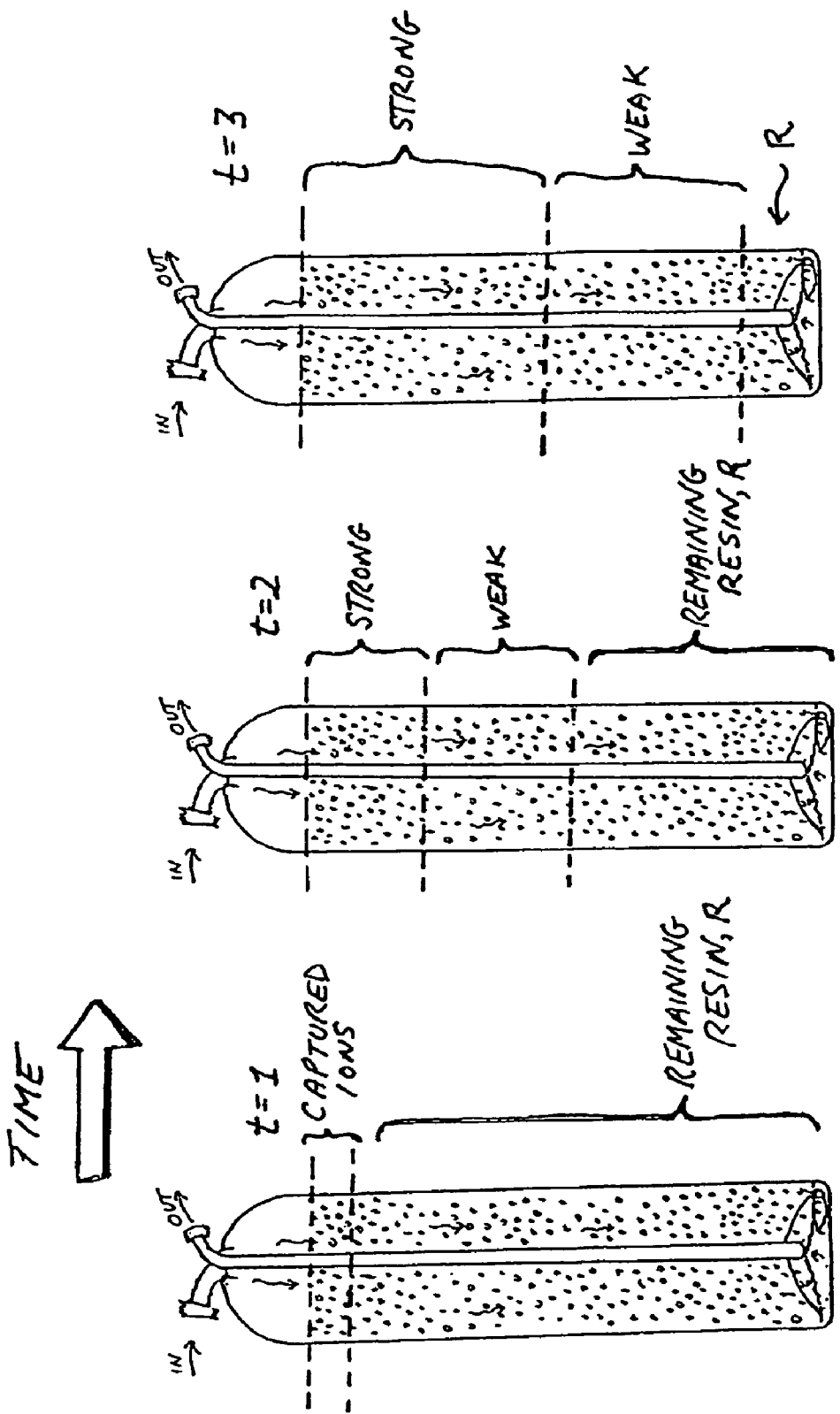

The overall course of medium activity and state of the medium bed over time is illustrated schematically in FIG. 2A, using ion exchange resin as an example of the capture medium. At time $t=0$ the resin is in a substantially completely regenerated state. Later, at time $t=1$ corresponding to a relatively fresh resin state, for example after about 5-10% of its useful duty life, a relatively shallow layer of resin near the inlet end 31 has captured ions from the treated water. The latter include both strongly bound ions and weakly bound ions. At this stage the resin below the capture zone remains strongly active and its functional exchange sites remain substantially in the hydrogen and the hydroxide forms, respectively. The resin in the capture zone itself may still possess substantial amount of anion exchange sites in the hydroxide state.

As further shown in FIG. 2A, at a later time $t=2$, the depth of the resin bed that has been substantially taken up by captured ions extends more deeply and the cumulative load of strongly bound ions has increased. The resin at the proximal end has many or most of its ion exchange groups occupied, and arriving strongly bound ions compete with, and displace, the already-captured but weakly bound species. The latter move further downstream, and are largely re-captured downstream by the essentially fully-regenerated resin. The effectiveness of this capture is weak, however, so that the weaker ions are taken up over a relatively long downstream plume. Thus, the resin bed 35 then has a longer "capture" zone, the composition of which is graded from a well-defined self-sharpening band upstream comprising predominantly strongly bound ions, to a diffuse (non-self-sharpening) region downstream thereof consisting predominantly of weakly bound ions. At such time $t=2$, a substantial portion (R) of the bed height still remains substantially fully regenerated, still quite effective at stripping residual ions from the water coming from upstream. For example, in the case of a bottle five feet in length, the region R may extend more than two feet along the downstream end of the flow path. Since strong ions are captured quite quickly, and even weak ions may be captured at a rate to effect a significant reduction in load (e.g., a 2 log reduction per 50 mm of travel through the fresh resin), all ions are still captured and remain within the bottle. The resin bottle functions properly.

The third panel of FIG. 2A shows the situation at a later time $t=3$. At this time, the total bed burden of removed minerals is quite large. The strongly bound ions have displaced weakly bound species toward the distal outlet 34a (FIG. 2), and the weakly ionic species such as silicic and boric acid, urea, amines now reside in a band broadly distributed downstream of the sharply define capture band comprising strongly bound ions. In actual operation, the bands are not clearly delineated; each involves a distribution tapering in concentration or extending into an adjacent region. Further, at such time $t=3$ the length R of the resin that remains substantially completely regenerated has become quite small, extending for perhaps only a few inches upstream of the outlet 34a. For many feed waters and treatment systems, the boron (boric acid) region may extend downstream of the silica (silicic acid) region and thus constitute an earlier breakthrough or quality-affecting event. As upstream resin exhaustion becomes more intensive and extensive, the remaining length R of strongly active resin may be able to trap/capture only a small fraction of the weakly bound ions reaching it. Weakly bound ions may then leak out, and the electrical conductivity of the effluent may thereafter start to rise detectably. Moreover, boron passage at $t=3$ (and potentially the other weakly bound species) may already increasing; A sensitive boron detector as described in the aforementioned international patent application may detect the increased boron concentration in the output, providing an indication that the exchange resin should be replaced or regenerated. Thus, the bottle may be taken out of service and its resin may be regenerated or replaced at this time rather than relying on the conventional, later, conductivity increase or silica breakthrough monitoring to determine when resin bottles are to be regenerated.

When regeneration of the exchange resin in the prior art is carried out after removing the resin from the bottle, typically the resin from many bottles, columns or beds is consolidated as a batch for regeneration. Mixed resins are first separated, e.g. by a hydraulic separation technique that relies upon the different settling rates in a flowing fluid (as determined by the differing particle densities, fluid density and other factors), or when such separation is not feasible, by additional techniques such as screening. The anion resins and cation resins so separated are regenerated separately. The anion exchange resin is regenerated by placing the resin in a bed and flowing very pure caustic (e.g., at a 4-8% concentration) through the resin bed to strip accumulated ionic loading and return at least the upstream portion to a substantially complete hydroxide form. The caustic remaining in the upstream portion is then driven downstream and removed, e.g., by physically driving the caustic solution out of the tank or regeneration vessel using a flow of intrinsic water. The caustic thereby contributes to the complete regeneration of the downstream resin. This regeneration step may be repeated one or more times, and this may be done in conjunction with one or more displacement or conversion (colloquially "salt squeeze") steps to enhance the effectiveness for removing one or more specific components of the ionic burden in the bed. The regenerated resin may the be rinsed down for an extended period, which may be as long as twenty four hours, until the rinse water has an acceptably low level of boron, or conductivity, or silica, TOC or other contaminants. Part of the rinse water may be recycled, with or without purification (e.g., by ED or EDI) to make up regenerant solution and initial rinses. In various known processes, if the resin is to be returned to a resin bottle, the regenerated resin is then loaded by flowing it in a liquid slurry or suspension into the bottle. When a mixed bed/bottle is desired, the regenerated resins may be mixed and then loaded into a bottle, or loaded and then uniformly intermixed. Mixing may be accomplished by applying a sparged bubbling or pulses of gas in a shallowly-covered bed of anion and cation exchange resin beads. The pulsatile regimen causes the different resins to become well interspersed. Thus, the regeneration steps involve much contact with water for operation of caustic displacement, rinsing, particle transport and mixing steps. Similar procedures should be used to thoroughly regenerate cation exchangers, e.g., using very pure sulfuric, hydrochloric or other acid instead of caustic.

In addition to or as an alternative to regeneration with pure caustic or pure acid, respectively, other regeneration methods have been proposed and may be in use. One such proposal is a process of regeneration by loading the resin into an electrodialysis unit and running a flow of demineralized UPW water through the unit for an extended period while the electrodes are energized. In this case the resin is regenerated and is stripped of a substantial portion of its ionic load by electrodialysis. See, e.g., Walters et al, Industrial and Engineering Chemistry 47 (1) (January 1955). In this case the concentration compartments are preferably also loaded with resin to lower the stack resistance, and electrical current is passed through the stack until the current efficiency, or transport of non-hydrogen, non-hydroxide ions is not detectably different from zero. The resin may then be removed from the stack and loaded in a bottle or bed. In this case also, the regeneration steps as well as the post-regen transport or handling and other steps involve extensive contact with water. In the case of electrodialytic regeneration, hydroxide and hydrogen ions are provided by water splitting at resin or bead interfaces; other electrolytic processes can be applied to regenerate resin by electrolysis at adjacent electrodes or composite membrane electrodes. See, for example, Galliland, U.S. Pat. No. 3,645,884. In accordance with a principal aspect of the present invention, water used in critical regeneration steps should be essentially free of the problematic species—in the above example, boron—or more generally the resin processing water should be essentially intrinsic water.

In addition to separation and regeneration of resin removed from bottles tanks or other containers, in situ separation and regeneration are also commonly practiced. For in situ regeneration of a mixed bed, suitable separation of the different resins is effected; for example, an upflow of fluid may be applied to the mixed bed to separate the exchange resin beads into an upper (anion) exchange resin layer and a lower (cation) exchange resin layer, and water may then be injected between the layers to maintain separation, or a layer of neutral beads of intermediate settling rate may be interposed to avoid creating a zone of mixed resin. A flow of caustic may then be introduced from the center upward and a flow of acid introduced from the center downward, to regenerate the respective resin layers. Once regenerated, the beads may be mixed in place and subjected to a top-down rinse to quality. Various other protocols may be followed. For example pure caustic may be passed through both layers, regenerating the anion resin and converting the cation resin to sodium form. The cation layer may be subsequently regenerated with pure, strong acid. Still other protocols may involve different sequences of regenerant flow between one or both ends and a central distributor/collector. During these processes, pure water may be passed through one half of the column to prevent intrusion of the regenerant flowing in the other half, and this water may serve as at least part of the rinse for such resin. Once regenerated by any of the above methods, the resins are remixed as describe above.

Some Preferred Embodiments

The discussion below is intended to encompass improvements in all such regeneration processes, by illustration, addressing in detail for clarity of exposition, the regeneration, fluid-contact and handling steps of a batch regeneration process.

Briefly, applicant has found that even a newly-regenerated resin bottle 30, containing resin that has been regenerated by a conventional process, when it is placed in a polish stage or final polish loop as described above, may release an unexpectedly high amount of undesirable contaminant, e.g., boron. The boron concentration in water leaving the bottle 30 may be greater than that entering in the treated stream. Applying a boron detection threshold as described above to determine when to replace the resin bottle would then result in an unusually short duty life, of hours or days, instead of weeks or months. Following a methodical investigation, applicant realized that this situation was caused by the presence of inexplicably high levels of boron loading in at least some of the resin beads present in a regenerated bottle, and that the regeneration process thus involved boron contamination. Applicant further surmised that boron-contaminated but otherwise regenerated resin resided, at least in part, at a downstream end of the bottle where effective recapture would not be achieved and boron leakage out of the bottle would thus arise. An analogous situation could apply to the other weakly bound species identified above, where the bing is fairly labile. Further investigation resulted in a realization that one source of the contamination resulted from contact with various rinse and other waters during the regeneration processing, and was exacerbated by localized enrichment processes and subsequent bead dispersal processes governed at least in part by the positioning and movement of resin during handling in the regeneration, rinsing and loading procedures.

To solve the problem of underperformance and premature breakthrough of the resin, applicant developed an improved regeneration process and system, wherein the improvement includes steps and apparatus for scrupulously controlling the undesired weakly bound entities in the water which will come into contact with the resin during the late stages of and after regeneration, e.g. employing substantially boron-free water for such contact. Such process and apparatus assure that boron is not inadvertently introduced into otherwise thoroughly regenerated resin, anion exchange, cation exchange or other. The process is applicable to address any and all weakly bound entities. In this regard, applicant realized that when a water intended to be essentially intrinsic, such as the UPW plant water, is employed for such post-regen processing water, then if that UPW plant water were produced during the time when the polish resin bottles approached exhaustion (e.g., near time $t=3$ in FIG. 2A when silica is about to break through or conductivity rise), the product stream would already have experienced elevated levels of boron for some period of time due to displacement or other release, and non-recapture of the downstream weak ions (FIG. 2A, $t=3$). The boron would be released in proportion to the total (i.e., integrated) ionic load of the water entering the polish bed. Thus, an extensive flow of such boron-laden water in the treated product stream still possessing apparently acceptable conductivity and high purity may have been accumulated and applied for regeneration (or other) purposes. Applicant further found that such water may introduce localized boron-enrichment in the freshly-regenerated resin, especially when a large volume of such water is used for an extended rinse down. Upon contact to a regenerated anion exchange resin, this boron-enriched water would lose its boron substantially instantaneously to a shallow surface layer of the regenerated resin bed, thus contaminating a localized layer of the supposedly fresh resin with a significant dose of boron. During a twenty-four hour rinse down, the boron loading acquired by the upper layer of resin would be quite high. When this regenerated but boron-contaminated resin is moved from the mixing/rinse tank into bottles, or is redistributed within the same bottle, the layer of beads thus contaminated can shift (as discussed in regard to FIG. 4A below) and be transferred as a slug to naturally fill a substantial portion of a bottle, or even worse, fill a portion of the distal end 33 of a bottle. In that event the layer could quickly start leaking boron from the otherwise regenerated resin column. As the surface layer slumps inwardly when resin is withdrawn from the regeneration tank, the resin with enriched boron loading may be drawn off as a slug into one or more bottles while earlier- and later-filled bottles remain unaffected. The formation of localized pockets or layers of regenerated resin that have acquired an enriched burden of weak ions is addressed in other aspects of the invention by techniques of resin segregation or separation during regeneration handling.

In addition to these aspects of unintended ion loading arising from the handling and rinse procedures, regeneration processes of the present invention preferably also address the possibility of "orphan" beads, that is, exhausted resin beads that fail to be regenerated either because they were left in the exhausted bottle (e.g., stuck to the wall during the emptying process), or were positioned in a stagnant space in the regeneration tank (e.g., in a dead-ended leg or stub, or below or between distributors). Great care is taken in transferring and handling the resin to avoid such sources of contamination.

The above circumstances are addressed and regenerated resin is prevented from acquiring boron loading in accordance with one aspect of the invention by using a boron concentration detector (or more generally a detector for any of this class of problem contaminants) in the polish stage of a treatment plant to determine whether the treated output is suitable for use in regeneration processing. When the concentration of boron starts to rise above a certain threshold (for example, one ppb), the water is stopped, or diverted or otherwise is not allowed to mix with or pass to the UPW stream or to the supply used in regeneration. For various configurations of the invention the detection threshold may be set at different values. For example a threshold of 70-80 ppt may be used for waters that are to be applied in quantity—such as rinse waters for final rinse down—to regenerated resin beds.

Rather than detecting boron concentration to assure the substantial absence of boron in the UPW product that is used for regeneration, the suitability of the UPW product may also be assured, in accordance with another aspect of the invention, by carrying out a polish loop operating procedure that always assures boron-free product. As described further below, this may be readily accomplished while reducing overall regeneration requirements by employing a staged polish unit, such as a two-bottle staged unit. One effective operating procedure may use a simple conductivity measurement at the upstream stage to achieve dependable limits on boron leakage.

Figure 4:
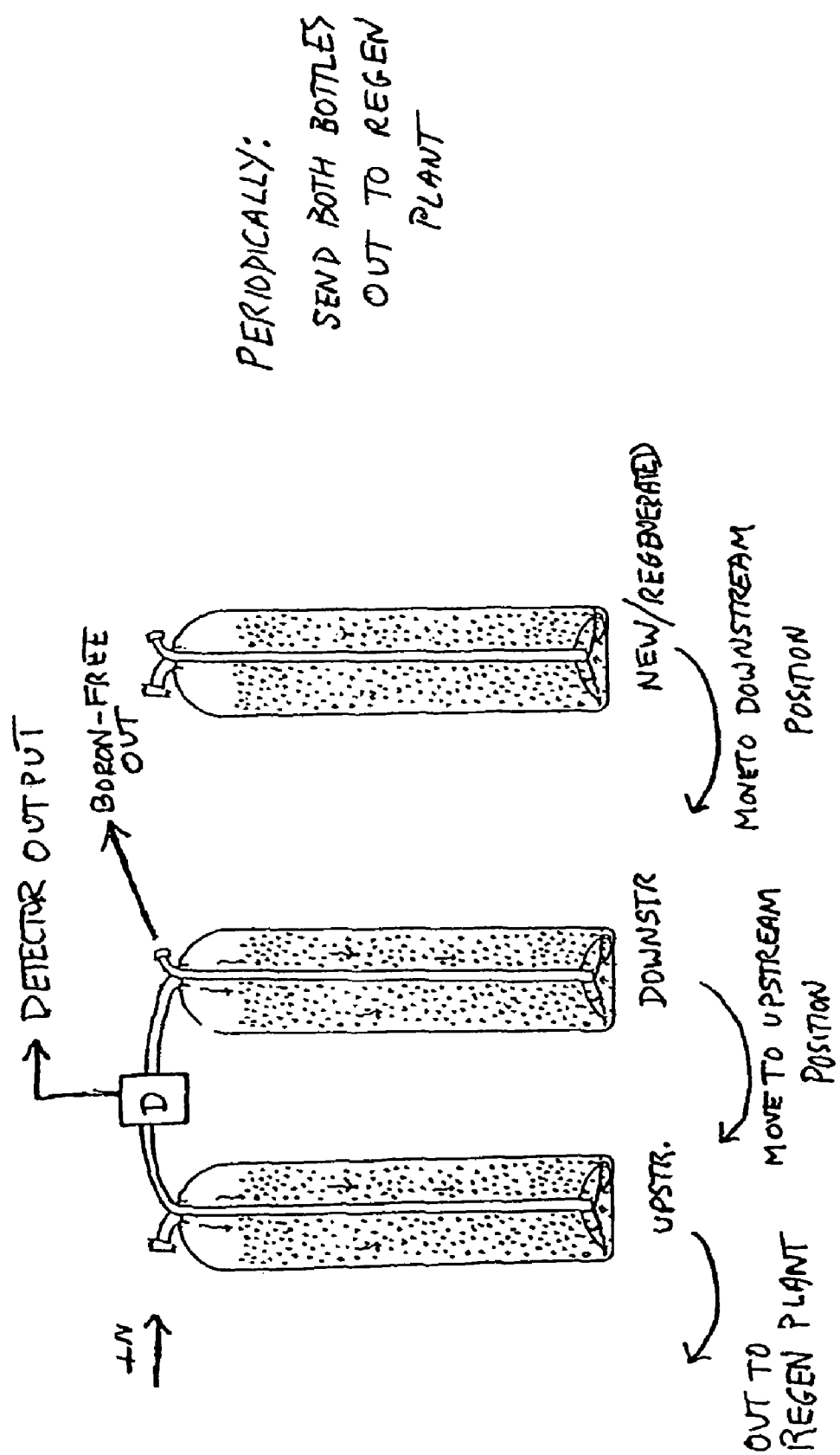
FIG. 4 illustrates UPW plant operation in accordance with another aspect of the invention.

FIG. 4 schematically shows such a UPW treatment system for providing product water for regeneration processing of resin, and operated to assure that contaminated water does not exit the treatment line. This is accomplished by providing a capture unit, or final polish unit operation that effects boron or other weak ion capture, and by operating the unit as described below.

The unit operations may include an upstream ion exchange bottle or stage and a downstream bottle or stage. Each of these units will typically comprise a single tank, or a number of bottles, e.g., about 4 to 40 bottles, of resin, in proportion to the required flow volumes and treatment line capacity, and these may, for example, be mixed resin. However, since the anion resin generally is exhausted first, the discussion herein shall refer to anion exchange resin, or to mixed resin with anion breakthrough occurring before cation breakthrough. Operation is as follows. Upon exhaustion of the upstream unit, the upstream unit is removed for regeneration, while the downstream unit is moved to the upstream position and a regenerated (or new) boron-free bottle is placed in the downstream position. The bottle status is detected by a detector D. In the embodiment of FIG. 4, the detector D is placed ahead of the downstream unit to detect exhaustion, or impending exhaustion, of the upstream bottle and determine when to shift the downstream bottle forward. With this lead/lag arrangement, the downstream position is largely shielded from the ionic loading, and thereby always provides a substantial ion exchange capacity that prevents any significant level of boron from leaking past it into the product water. The polish stage may also comprise more than two such units, for example in a carousel, wherein the respective units are successively shifted forward upon each breakthrough detection of a front unit.

The invention may be implemented with different detectors and operating protocols.

When the detector D is a simple conductivity detector, then the upstream bottle may have started shedding boron by the time detector D registers a change threshold; however the downstream bottle will have ample capacity, and will effectively capture this initial boron leakage at its upstream end. Thus, the downstream bottle will be only slightly boron-loaded (with boron confined to the upper region of the bottle) when it is moved to the upstream position and replaced with a regenerated bottle. In this case, when the (conductivity) detector next registers an increase indicative of impending bottle exhaustion, boron will have been leaking for a longer period. The downstream bottle will have a greater loading extending diffusely toward its downstream end. To address this situation, the lead/lag bottle replacement protocol is modified by periodically replacing both bottles concurrently—for example, at every second or third detector threshold detection. A similar modified lead/lag protocol with periodic replacement of both bottles may be followed when the detector employed as detector D is a silica detector located between the bottles to indicate upstream bottle exhaustion. Alternatively, a boron detector may be employed. In this case, the detector may be positioned downstream of the downstream bottle, and a similar modified lead/lag protocol may be followed to prevent boron leakage in the product water. Alternatively, the detector D may be a boron detector positioned between units as shown in FIG. 4. This is a preferred approach, since the detection is direct and does not depend on correlated conductivity changes. In that case it may then detect the state of the upstream bottle earlier, and no boron loading will occur in the downstream bottle. When using a boron detector, a strict lead/lag bottle replacement regimen (with or without periodic replacement of both bottles) is effective to assure that no boron leaks into the polished product water. It is also possible to employ a sequence of three bottles in the process to further guard against leakage of the downstream bottle between complete replacements.

Thus, these operating and detecting steps assure that at no point does the lag bottle become saturated with boron or start bleeding boron into the product stream. The analytic determination of the replacement interval for sending both bottles out for replacement may be made based on cumulative effects of low-level boron release or passage from upstream units, or the cumulative increase in baseline downstream loading, since the last complete resin regeneration. When the boron detector is positioned between the upstream and downstream ion exchange units as shown in FIG. 4, then conventional lead/lag bottle replacement assures boron-free water. In embodiments wherein detector arrangement does permit weak ions to reach the downstream bottle, the boron problem may also be addressed by replacing both bottles but subjecting the downstream bottle to a lighter regeneration, thus saving regeneration costs.

Figure 3:
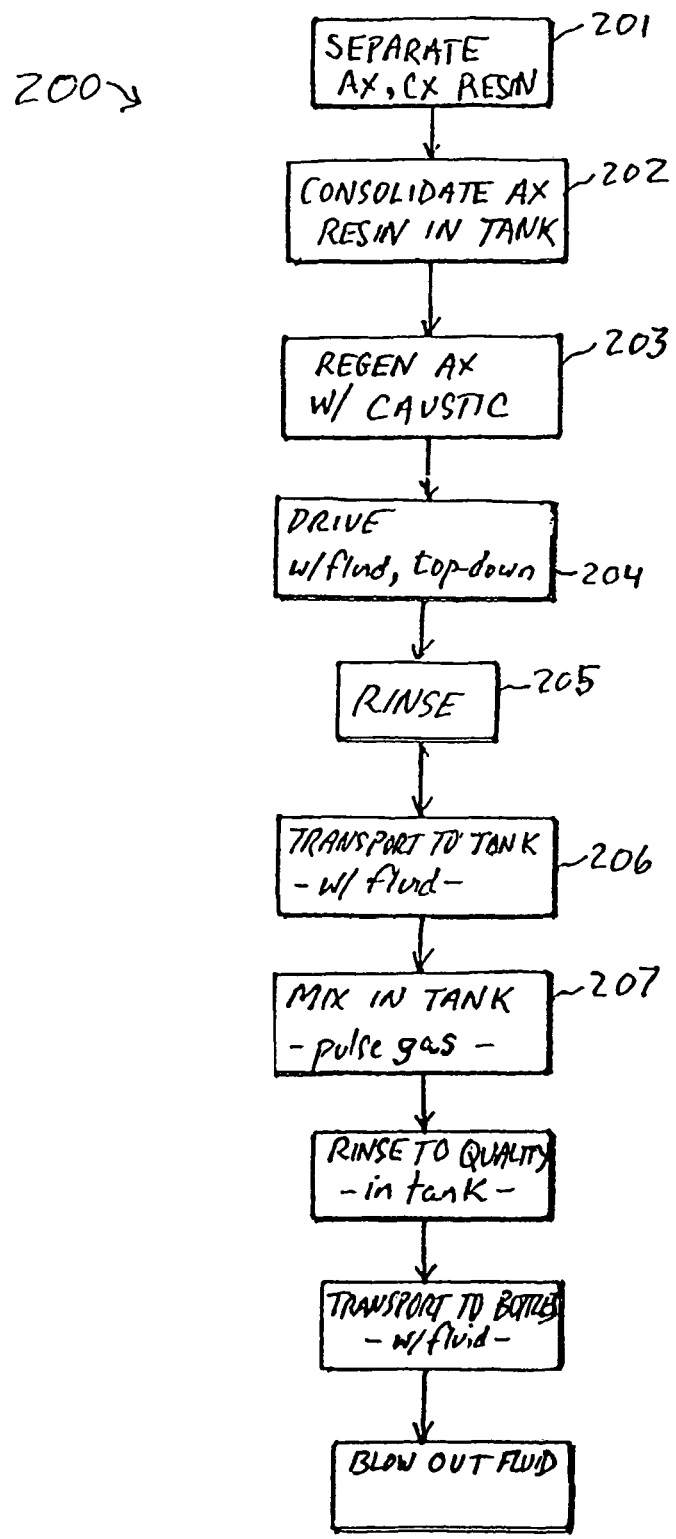
FIG. 3 illustrates a resin regeneration process in accordance with one aspect of the present invention.

The problem of resin contamination during regeneration may also be addressed by other steps in accordance with the present invention. This will be better understood from a discussion of typical prior art regeneration processing 200 as shown in FIG. 3. At a first stage 201, resin from spent bottles or other vessels is separated into anion (AX) exchange resin and cation (CX) exchange resin. Typically, mixed resins are compounded with different size and density for the two types, allowing the two resins to be isolated by hydraulic separation. The AX and CX resins are then loaded into separate tanks at stage 202, and the AX resin is treated with very pure caustic at stage 203 at a suitable concentration, e.g., typically 4%-8%. The caustic treatment displaces a most if not all of the captured ions from the spent resin, as well as organic and inorganic foulants, regenerating the resin to hydroxide form. Often the resin may contain polymeric silica, and it is then desirable to use the caustic to accelerate depolymerization of the silica. A substantial soak time may then be required.

The caustic is then displaced from the regeneration tank at step 204 by a flow of clean water, which may also be warm. Typically the clean water at stage 204 is applied along the same direction as the caustic, typically from the top of the tank, pushing the caustic downwardly and out. The clean water thus contacts the fully regenerated resin, and any minerals present in the clean regen water are immediately captured by the upper few inches of the resin bed. Thus, at this stage, if the clean regen water in fact possessed a boron loading (or other weakly bound species), the upper few inches of the resin in the tank would pick up substantially all of this boron or other species immediately downstream of whatever region had been occupied by any strongly bound ions.

Washing with caustic may be performed several times, together with ancillary processes, such as displacement or conversion steps that enhance the rate or endpoint of removal of the captured ions. One or more rinses 205 may also be applied at this stage, again with the possibility of stripping ions from the rinse water into the upstream few centimeter layer of the resin in the regen tank.

The regenerated cleaned resin is then transported with fluid to a remix tank 206 and combined with regenerated CX resin. The resins at step 207 are mixed in the remix tank. Typically, movement of the resin from the regen tank to the remix tank is carried out hydraulically, in a fluid flow using clean water to transport the resin. In the remix tank the resin undergoes a mixing operation 207 to uniformly intersperse the different AX, CX resins. This mixing is also a fluid-contacting operation, and is typically effected by blowing down the water level to about an inch above the surface of the resin, and applying short bursts of inactive gas (i.e., gas free of ammonia, carbon dioxide or other components that might interact with the exchange resin) upward from the bottom of the tank to agitate the resin beads without, however, permitting fluidized settling or sedimentation of the beads to occur. Once the regenerated resins have been remixed, they are rinsed down to quality in the remix tank or another tank at stage 208. This may be a lengthy rinse, typically a few hours but possibly tens of hours, so that a substantial amount of ions may be captured from the rinse water, if any are present. Typically, following rinse down, the clean regenerated resin is next transported to bottles at a step 209. Transport to bottles is typically performed as a flow of hydraulic slurry, and the fluid is then blown out of the bottles at stage 210.

Thus, following caustic treatment or treatments of the anion exchange resin with caustic, there are a number of stages where clean water and or gas contacts the resin. When this fluid is applied top-down either as a single pass or circulated flow, any ions present in the fluid may become captured at higher concentration in a localized (top or upstream) stratum of the resin, thereby producing a body or layer of more highly-laden resin particles that will later shed their weak ions when placed in service. If this ion capture occurs before the resin is loaded in the final bottles, the contaminated beads may end up in the downstream end of the resin bottle.

Figure 4A:
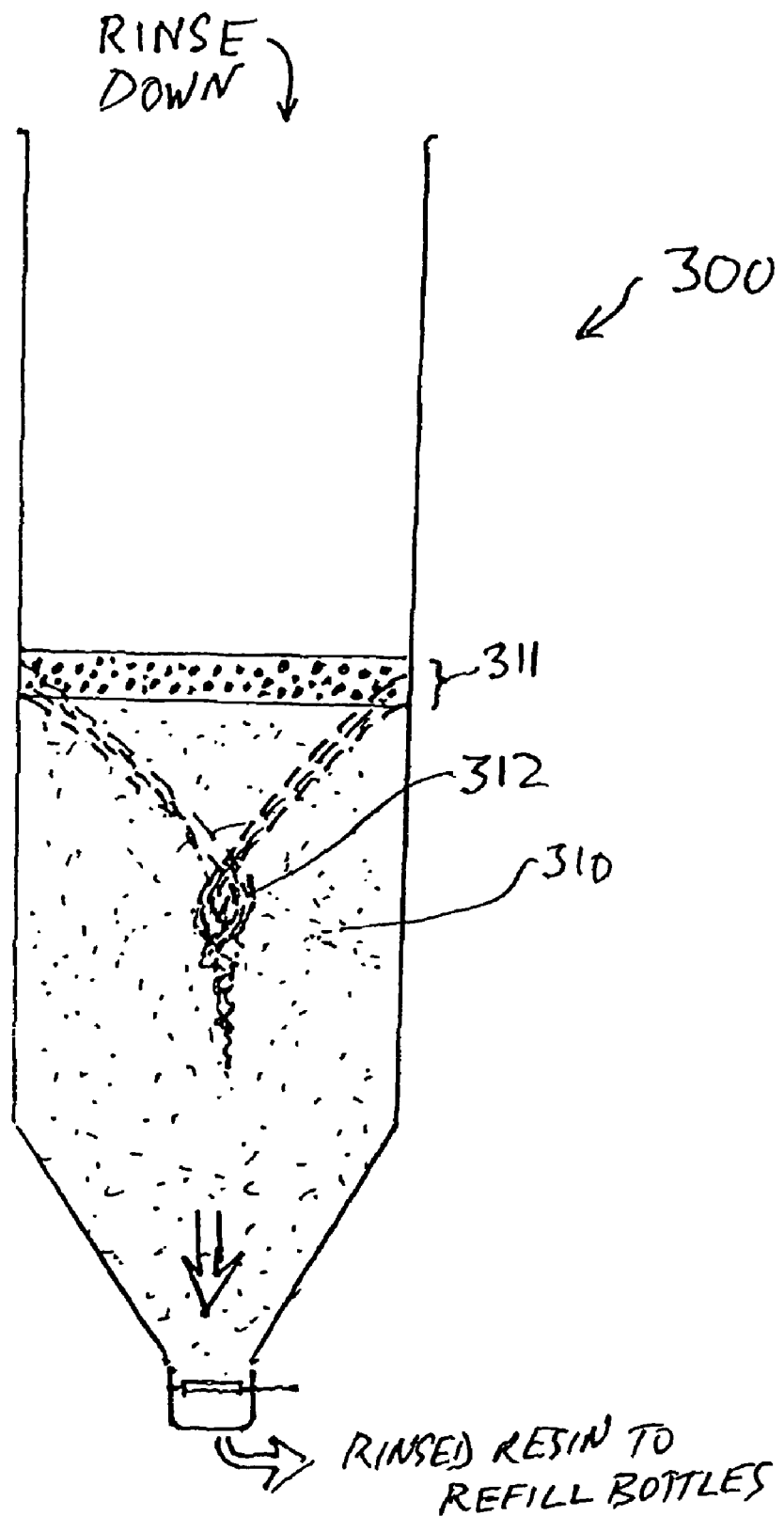
FIG. 4A illustrates resin contamination during regeneration.

FIG. 4A illustrates this situation and its evolution during the regeneration procedure. A remix tank 300, holding by way of example about fifty cubic feet (2 m$^3$) of regenerated resin 310, has been rinsed down for an extended period, resulting in the formation of a layer of enriched or ion-laden resin 311 at the top of the tank. The solid lines represent the situation immediately after rinse down to quality. That rinse down constitutes the major exposure to water in the regeneration processing, and thus has the greatest potential to form substantially enriched (contaminated) layers or pockets of resin. In FIG. 4A, a layer up to several inches deep has been formed at the surface of the bed during step 208. As the rinsed resin is drawn from the tank into clean resin bottles at step 209, the remaining resin slumps, as shown by the dashed line contour in FIG. 4A. The contaminated layer moves centrally and downward, forming a plug-like or concentrated body 312, schematically shown as a dark descending whorl or vortex in the remaining resin. As is apparent in FIG. 4A, this spatially-concentrated mass of recontaminated resin may be drawn as a single mass or slug, or as several successive masses or slugs, into a bottle being refilled. The first few bottles are thus filled with clean resin delivered exclusively from the bottom of the tank, while one or more of the subsequent bottles, or downstream ends of the subsequent bottles, may be filled to a substantial or even complete extent with significant amounts of the recontaminated resin 311.

The invention solves the above problem in one or more of several ways. Thus, by assuring that the water used for regeneration is sufficiently is clean, i.e., is substantially intrinsic water, free from boron and strongly bound as well as weakly bound entities generally, as discussed above, applicant assures that the regenerated resin does not acquire such a boron-laden or recontaminated band 311, 312, and moreover possesses an essentially unmeasurably low loading of such entities throughout. As a result, bottles or beds packed with the regenerated resin will not have highly contaminant-laden resin loaded into or dispersed within it. Instead, they will have essentially pristine resin throughout, and will result in a well-defined and clearly detectable residual ion concentration in the product water that is readily interpretable as a bed aging curve for effecting fab plant treatment control. That is, the beds will exhibit the expected high purity water until shortly before true resin exhaustion. This will allow the detection methods described above (electrical conductivity, boron concentration, silica concentration) to be used to determine when the effluent water may be safely used, e.g., in a fab plant. It also allows the detection to predict the time when bottle regeneration or replacement will be required. The same handling precautions allow virgin resin to be dependably handled and installed without contamination.

As noted above, the common practice of processing the regenerated resin with supposedly clean rinse or other water can lead to contamination of upstream portions in a rinse tank when such water in fact contains contaminant species. Such contaminated portions or layers have been found to be a significant source of dispersed contamination under the normal handling conditions discussed above. However, one method of addressing that problem in accordance with the present invention is to reload the resin in its final bottles before rinse down. This assures that, although the top stratum of resin in the bottle or vessel may acquire ionic loading, the contaminated resin is not dispersed and leakage of weakly held ions will not occur until natural exhaustion in continued use proceeds along the full depth of the bed.

In another aspect of the invention, to assure that no bottle or vessel receives a bolus of recontaminated resin, applicant rinses in a conventional fashion, but physically separates the top stratum of rinsed resin from the remainder of the regenerated resin at this stage of the resin regeneration process, leaving only uncontaminated resin to refill bottles or vessels. In one embodiment of this aspect, this is achieved by placing a screen, perforated tray or other bead-retaining structure some inches below the upstream surface of the bed of regenerated resin in a final rinse-down tank. Conveniently this structure may be a liquid distributor. After final rinse down, resin above the screen may be lifted out or flow-transported from the vessel. The remaining major portion of the bed is then free of contamination and may be safely transported out the lower end of the tank into bottles or other vessels. The possibly contaminated upper portion that is removed may be recycled to the regeneration process. When physical separation of the resin bed in this manner is used, the rinse water need not satisfy the stringent purity level described above; the regenerated resin is allowed to suffer local contamination and the contaminated top layer is simply separated; and preferably retained to be added in to the next tank for regeneration. The lower portion of the bed would be substantially free of ions and ready for filling into bottles.

Such embodiment is equivalent to a final final polish of the input rinse down water. The portion of resin subject to contamination may therefore be loaded into a first rinse tank, the remainder loaded into a second such tank and the rinse down water then passes through the first tank, the effluent therefrom flowing into the second tank.

Figure 4B:
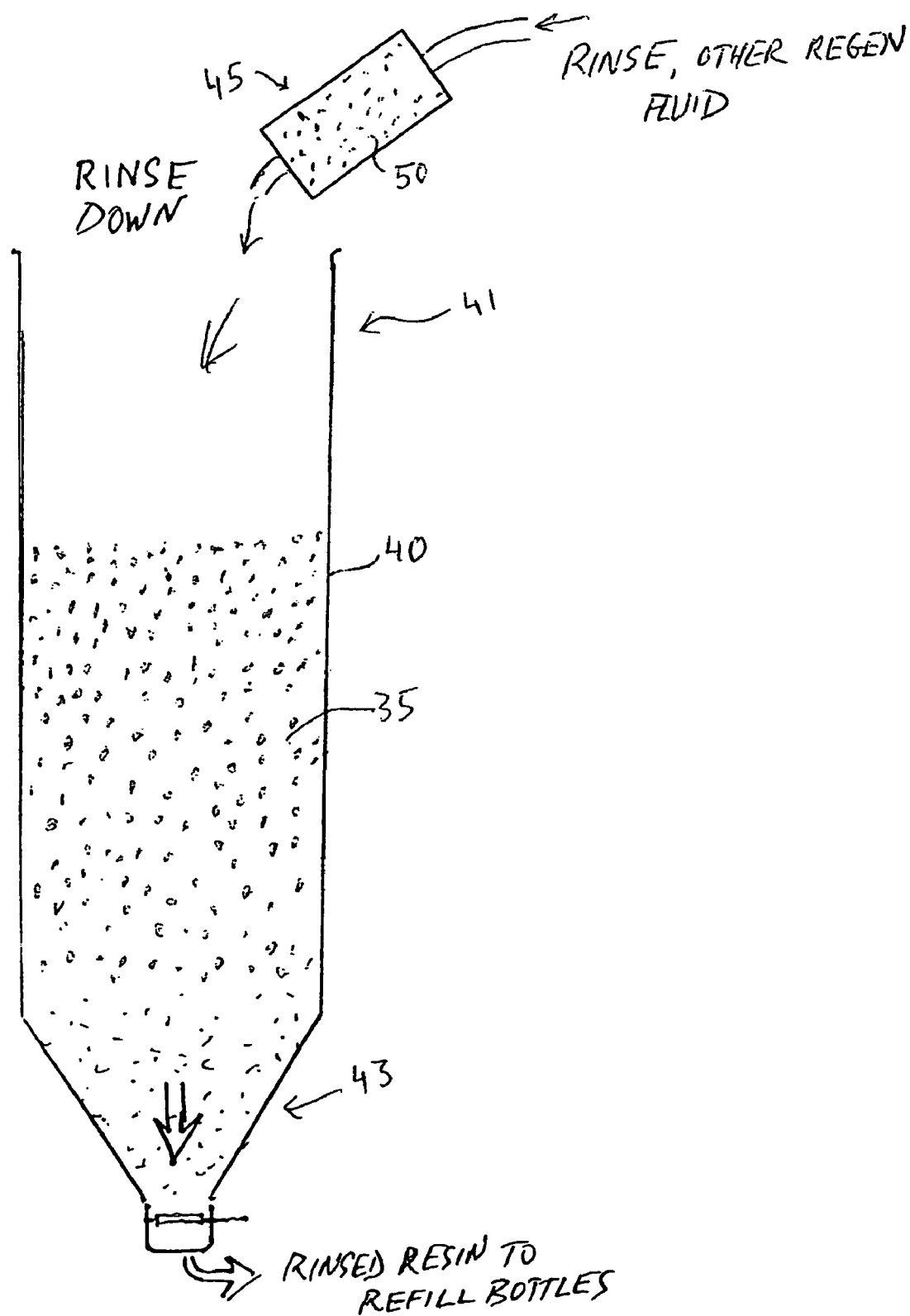
FIG. 4B illustrates a separation device according to another aspect of the invention for addressing the contamination of FIG. 4A.

In accordance with another aspect of the invention, physical separation of contaminated regenerated resin may also be achieved by providing a phantom stratum or pre-layer of resin ahead of the regenerated bed, or regenerated and mixed bed, to capture the ionic load of the rinse water. The phantom pre-layer is preferably provided as a resin-filled cap, cartridge, bed, bottle or another vessel that fits in-line upstream of or above the regenerated resin during a rinse operation, effectively polishing and/or re-polishing the intended rinse water before it reaches the resin bed. Such a phantom stratum may have a considerably larger volume than the strata discussed above, and may serve for many regen batches. The effluent leaving the stratum should be monitored for quality, and its resin replaced or regenerated long before breakthrough of weakly held species occurs. Such a phantom stratum arrangement is illustrated for a cylindrical tank 40 in FIG. 4B. The tank has a top or proximal end 41 and a distal or bottom end 43, with an outlet port at the distal end. The pre-layer may be embodied as a cap or a cartridge structure 45 that fits on top of the tank 40, and holds a bed, preferably at least several inches long along the direction of rinse flow, of regenerated resin 50. The bed depth may be less if finer size resin beads (such as employed for power plant condensate polishing) are used. The resin 50 may be identical to the resin 35 that is being rinsed. However, cap structure 45 separates and secures the resin 50 in an upstream position, so that any ionic loading in the rinse water will be entirely taken up by the resin 50 rather than the resin 35. After rinse, the cap is removed, and the tank or bottle (stage 208 or 209, above) is treated as before. The pre-layer may also be embodied in an in-line cartridge (illustrated) through which fluid is provided to the top of the tank. The cartridge may be placed in the caustic path to the regeneration tank and thus be regenerated when not used for polishing rinse water.

Thus, physical separation of the potentially loaded layer will assure that the regenerated remainder of the resin is suitably clean for UPW polish applications, and the bottles of ion exchange resin refilled from the mixing tank will have long life and dependably low leakage of weakly ionic species. During the rinse to quality, the effluent of the resin column may be monitored for a boron endpoint to assure optimum suitability of the regenerated beads. This data may also be used to modify or control regeneration process variables. In water treatment systems having a boron monitoring on polish stages, one or more flows may be controlled based on detected boron leakage levels, or on boron concentration and temperature.

It will be understood by those skilled in the art that various substitutions or changes in elements may be employed in carrying out the invention. Thus, rather than employing a detector between polishing units, the invention may employ a probe that samples water from a position between polishing units, or from an intermediate position or depth of a polishing bed of resin or elsewhere. Similarly, while the invention has been described in relation to conductivity and to weakly ionic silica and boron species captured in anion exchange resins, similar effects apply to cation exchange resins, and the invention contemplates corresponding precautions, changes in regeneration handling, introduction of sacrificail or phantom resin strata in the flow path, and other effective counter measures to assure purity of regenerated cation exchange resins.

The invention being thus disclosed and illustrative embodiments described, further variations and modifications within the scope and spirit of the invention will occur to those skilled in the art, and all such variations and modifications are considered to be within the invention as defined herein and by the claims appended hereto.

The invention claimed is:

1. An improved process for regenerating ion exchange resin, the regeneration process including displacing captured ions from the resin to regenerate its ion-capture functionality followed by one or more fluid-employing steps such as rinsing the resin to remove excess material, to mix or to transport the resin, wherein the improvement comprises the step controlling said fluid-employing steps such that the resin does not contact boron-containing water.

2. The improved process of claim 1, wherein the step of controlling is performed by employing boron-free water obtained by the steps of purifying water, monitoring boron concentration in said water, and delivering the purified water to a regeneration process only when boron concentration lies below a threshold level effective to assure that said purified water is essentially boron-free water such that rinsing with said purified water does not load boron in regenerated resin.

3. The improved process of claim 1, wherein said step of controlling is performed by employing boron-free water obtained by the steps of purifying water with a polisher, delivering the purified water to a regeneration process, and stopping said purified water when a detectable rise in boron concentration is detected in water from the polisher.

4. The improved process of claim 1, wherein said step of controlling is performed by employing boron-free water obtained by the steps of purifying water including passing said water through an ion exchange bed, delivering the purified water to a regeneration process, and stopping flow of said water upon detection of an early bed exhaustion condition so that only substantially completely boron free water is delivered to the regeneration process.

5. The process of claim 4, wherein said step of detecting an early bed exhaustion condition is performed by a low level boron detection probe positioned in the bed.

6. The improved process of claim 1, wherein said step of controlling the fluid-employing steps is performed by arranging a two stage polisher and applying a modified lead/lag bottle replacement schedule upon detection of boron above a low threshold in water from the first stage.

7. The improved process of claim 6, wherein the modified lead/lag bottle replacement schedule includes periodic concurrent replacement of both bottles.

8. A process for substantially preventing early leakage of one or more ionic species from a vessel of substantially completely regenerated ion exchange resin, wherein the ionic species are
- i) ionic species other than hydrogen or hydroxide ions that are weakly held by such ion exchange resin, or
- ii) ionic species other than hydrogen or hydroxide ions that exhibit non-self-sharpening fronts during ion exchange with such resin wherein the process comprises the steps of
providing completely regenerated ion exchange resin essentially free of said one or more ionic species, and thereafter performing one or more steps belonging to the rinsing and handling group of steps, comprising
- a) providing ultrapure water and/or one or more gases each being essentially free of said one or more ionic species, and rinsing and handling said resin solely with said ultrapure water and/or gases;
- b) rinsing and or handling said resin with deionized water and or one or more gases so as to produce a first stratum predetermined to contain substantially all of any of said one or more ionic species removed from said water and/or one or more gases, and separating or maintaining separate said first stratum from said resin whereby the completely regenerated resin is essentially free of said one or more ionic species.

9. The process of claim 8, wherein said one or more ionic species comprises boron and wherein the step of providing ultrapure water that is essentially free of boron includes the step of monitoring a polish loop to detect low level boron breakthrough and utilizing ultrapure water from the polish loop only prior to detection of low level boron passage.

* * * * *